US012355095B2

(12) United States Patent
Salter et al.

(10) Patent No.: US 12,355,095 B2
(45) Date of Patent: Jul. 8, 2025

(54) BATTERY ENCLOSURE AND METHOD OF MANUFACTURING A BATTERY ENCLOSURE

(71) Applicant: Ford Global Technologies, LLC, Dearborn, MI (US)

(72) Inventors: Stuart C. Salter, White Lake, MI (US); Renata Michaela Arsenault, Plymouth, MI (US); Brian Joseph Robert, Saint Clair Shores, MI (US); Ann O'Neill, Dearborn, MI (US); David Brian Glickman, Southfield, MI (US); Kent Snyder, Dearborn, MI (US); Lorne Forsythe, Wind Lake, WI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 18/077,701

(22) Filed: Dec. 8, 2022

(65) Prior Publication Data

US 2024/0195001 A1 Jun. 13, 2024

(51) Int. Cl.
*H01M 50/262* (2021.01)
*H01M 50/249* (2021.01)

(52) U.S. Cl.
CPC ....... *H01M 50/262* (2021.01); *H01M 50/249* (2021.01)

(58) Field of Classification Search
CPC ............. H01M 50/262; H01M 50/249; H01M 50/264; H01M 50/169
USPC ........................................................ 429/163
See application file for complete search history.

(56) References Cited

U.S. PATENT DOCUMENTS

| 3,386,860 | A  | * | 6/1968  | Maier .................. B29C 66/542 264/261 |
| 6,651,872 | B2 |   | 11/2003 | Johnson et al. |
| 8,298,700 | B2 |   | 10/2012 | Asahina et al. |
| 2013/0071727 | A1 | * | 3/2013 | Hirai .................. H01M 50/528 29/730 |
| 2016/0133894 | A1 | * | 5/2016 | Onodera ............... H01G 11/78 429/163 |
| 2016/0344059 | A1 | * | 11/2016 | Mack .................. H01M 50/229 |
| 2017/0244072 | A1 |   | 8/2017  | Robert et al. |
| 2018/0097208 | A1 | * | 4/2018 | Maeda ................ H01M 50/553 |
| 2019/0288353 | A1 |   | 9/2019  | Harris et al. |

(Continued)

FOREIGN PATENT DOCUMENTS

| JP | 2002157984 | 5/2002 |
| JP | 2012084248 | 4/2012 |
| JP | 2012227080 | 11/2012 |

(Continued)

OTHER PUBLICATIONS

Melting Point of Common Metals, Alloys, & Other Materials, 2024, American Elements, p. 8 (Year: 2024).*

(Continued)

*Primary Examiner* — Jonathan G Leong
*Assistant Examiner* — John S Medley
(74) *Attorney, Agent, or Firm* — Burris Law, PLLC

(57) ABSTRACT

A battery assembly includes a base including a first locking feature, a lid including a second locking feature, and a metal joint fusing the first locking feature to the second locking feature. The metal joint is configured to melt to disconnect the first locking feature from the second locking feature.

20 Claims, 4 Drawing Sheets

(56) References Cited

U.S. PATENT DOCUMENTS

2023/0344058 A1    10/2023  Salter et al.

FOREIGN PATENT DOCUMENTS

| JP | 2014050876 A | * | 3/2014 | ............ Y02E 60/10 |
| JP | 2014102895 A | * | 6/2014 | ............ Y02E 60/10 |
| KR | 20120060287 A | * | 6/2012 | .......... H01M 50/103 |
| WO | WO-2012039247 A1 | * | 3/2012 | ............ H01M 50/15 |

OTHER PUBLICATIONS

Kovar® Technical Data, 2015, High Temp Metals, p. 2 (Year: 2015).*
Aluminum Oxide, 2024, American Elements, p. 2 (Year: 2024).*
Overview of Materials for 1000 Series Aluminum, 2024, MatWeb, p. 2 (Year: 2024).*
Cheng, et al., A review of lead-free solders for electronics applications, Abstract, Introduction, and Section snippets, Microelectronics Reliability, Aug. 2017, 7 pages, vol. 75, ScienceDirect, Elsevier Ltd.
Humpston, et al., Principles of Soldering, Apr. 2004, pp. 5-8, The Materials Information Society, ASM International, available at URL https://books.google.com/books?id=cQ6khQScBF4C&lpg=PR7&ots=TGI36JONGm&dq=difference%20solder%20brazing&lr&pg=PA5#v=onepage&q=difference%20solder%20brazing&f=false.

\* cited by examiner

BATTERY ENCLOSURE AND METHOD OF MANUFACTURING A BATTERY ENCLOSURE

FIELD

The present disclosure relates to recyclable vehicle batteries, particularly battery enclosures with removable joints and the manufacture thereof.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs disposed within a battery housing and having lithium-ion batteries cell assemblies such as modules or arrays, for example, or any other suitable electrical power storage units. The battery pack typically powers one or more motors to drive a set of wheels.

Battery assemblies for electric vehicles may use replaceable and recyclable components. For example, a battery cell array can be routinely replaced during the lifetime of the electric vehicle. The battery cell array can then be recycled to use in new vehicle batteries or other energy storage systems. Conventional battery assemblies seal the battery cell array within an enclosure. It can be difficult to efficiently open and reseal conventional used battery assemblies for recycling or servicing.

The present disclosure addresses these and other challenges related to vehicle batteries.

SUMMARY

This section provides a general summary of the disclosure and is not a comprehensive disclosure of its full scope or all of its features.

In one form, a battery assembly includes a base including a first locking feature, a lid including a second locking feature. and a metal joint fusing the first locking feature to the second locking feature. The metal joint is configured to melt to disconnect the first locking feature from the second locking feature.

In variations of the battery assembly, which may be implemented individually or in combination: one of the first locking feature and the second locking feature is a groove, and the other of the first locking feature and the second locking feature is a tab disposed in the groove; a channel is disposed below the first and second locking features, the channel arranged to receive molten metal from the metal joint; the channel is disposed on the base and extends upward toward the lid; the metal joint has a melting temperature below respective melting temperatures of the first locking feature and the second locking feature; a battery is disposed in the base; an insulator is disposed between the battery and the first and second locking features; the metal joint is one of a solder joint and a braze joint; the base includes a protrusion disposed opposite the second locking feature; a battery and an insulator are in contact with the protrusion and the battery; the insulator is configured to absorb heat from the base; the first and second locking features are biased toward each other upon melting the metal joint.

In another form, a method of accessing components within a battery enclosure includes applying heat to a metal joint connecting a lid of the battery enclosure to a base of the battery enclosure to melt the metal joint, disconnecting the lid from the base, and removing one or more battery components from the base.

In variations of the method, which may be implemented individually or in combination: further including actuating one of a laser, an electric heater, or a combustion heater to apply the heat to the metal joint; applying pressure to an outer portion of the base to disconnect the lid from the base upon melting the metal joint; increasing an air pressure in an interior of the battery enclosure to force melted metal of the metal joint away from the lid; the metal joint is one of a braze joint and a solder joint.

In another form, a method of accessing components within a battery enclosure includes positioning a heater adjacent to a metal joint connecting a first locking feature disposed on a lid of the battery enclosure to a second locking feature disposed on a base of the battery enclosure, actuating the heater to melt the metal joint, collecting molten metal from the metal joint in a channel disposed on the base beneath the first and second locking features, disconnecting the first locking feature from the second locking feature, removing the lid from the base, and removing one or more battery components from the base.

In variations of the method, which may be implemented individually or in combination: further including increasing an air pressure in an interior of the battery enclosure to force molten metal of the metal joint away from the first and second locking features; applying pressure to an outer portion of the base to disconnect the second locking feature from the first locking feature upon melting the metal joint.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
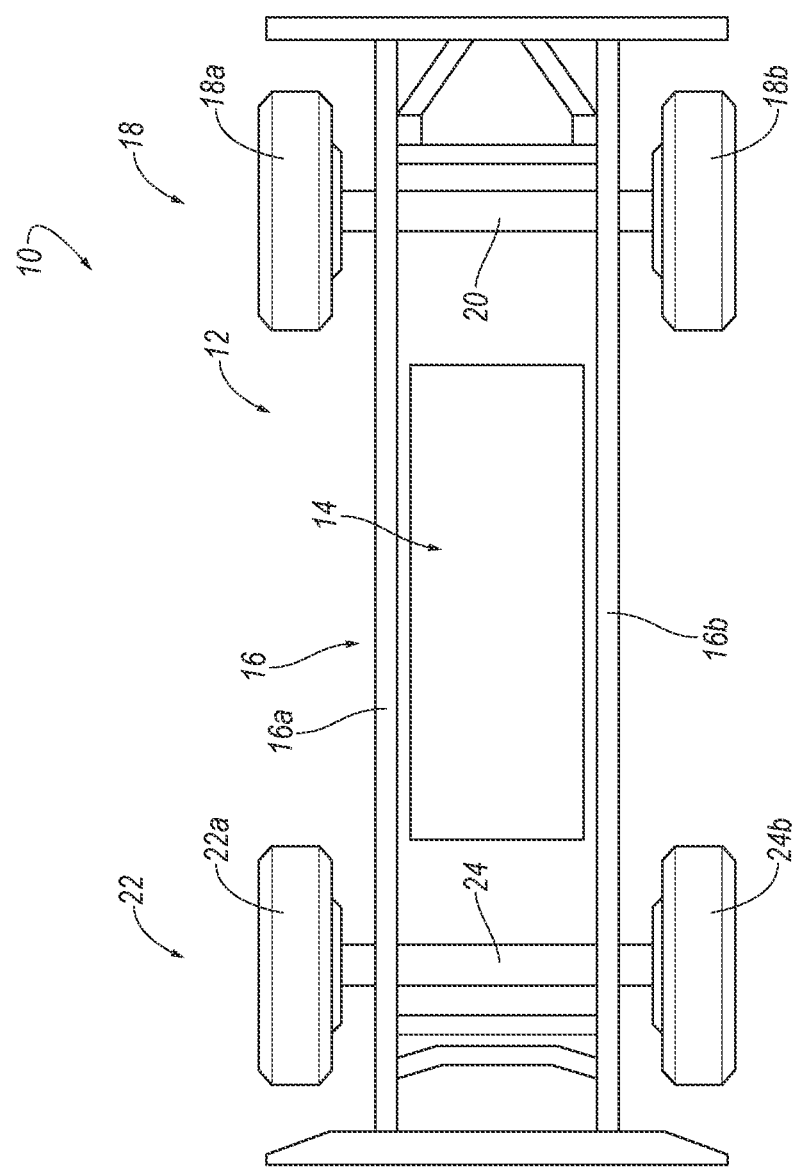
FIG. 1 is a schematic bottom view of a vehicle including a battery assembly according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery assembly 14. The vehicle frame 12 is the main supporting structure of the vehicle 10, to which various components are attached either directly or indirectly. The vehicle frame 12 includes opposed longitudinal rails 16a, 16b of a set of rails 16. The rails 16a, 16b are spaced apart from each other and may establish a length of the vehicle frame 12.

The battery assembly 14 powers a rear motor (not shown) to drive rear wheels 18a, 18b of a set of rear wheels 18 via a rear axle 20. Additionally or alternatively, the battery assembly 14 powers a front motor (not shown) to drive front wheels 22a, 22b of a set of front wheels 22 via a front axle 24.

Figure 2:
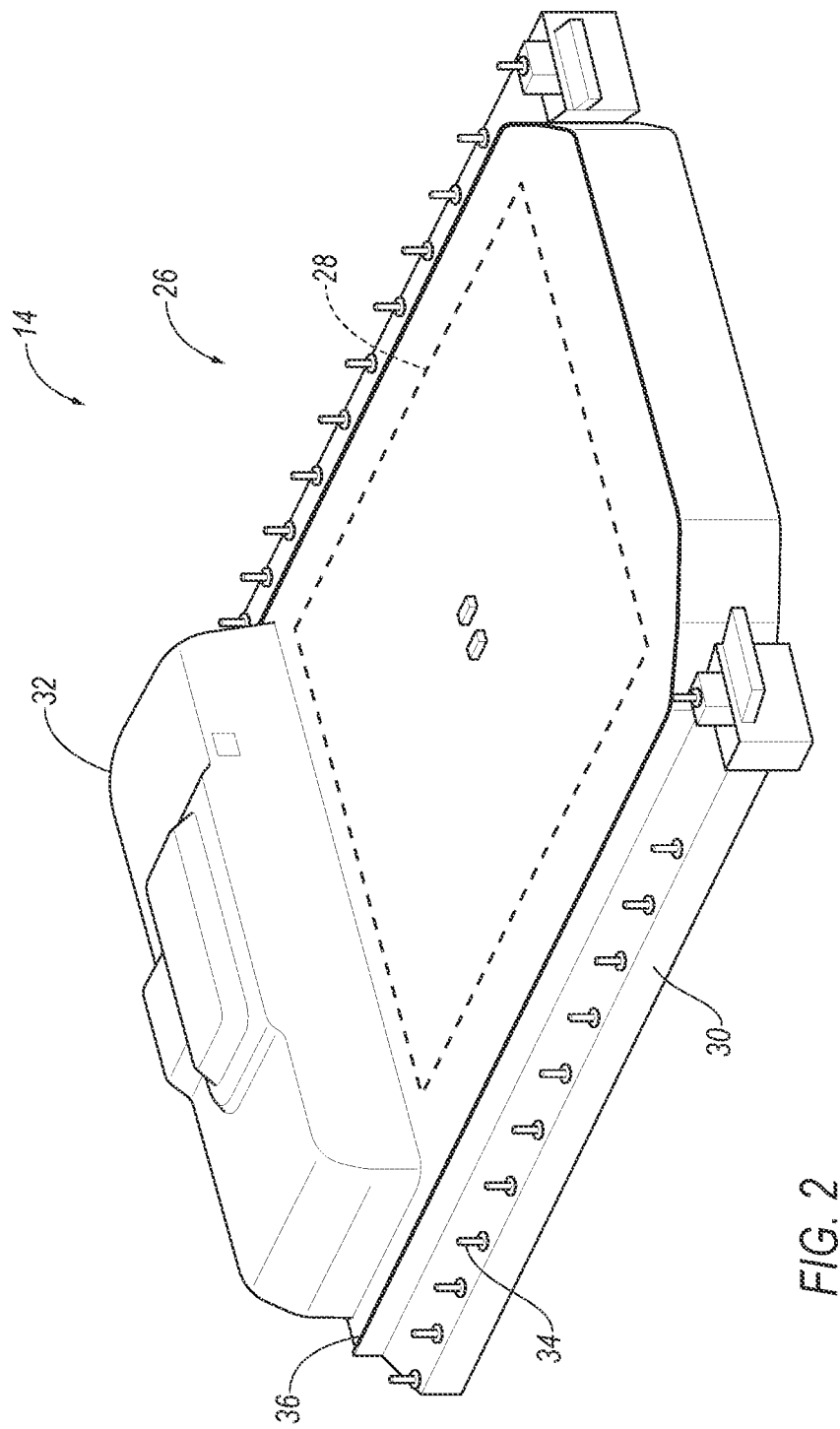
FIG. 2 is a perspective view of the battery assembly according to the present disclosure.

With reference to FIG. 2, the battery assembly 14 includes a battery enclosure 26. The battery enclosure 26 houses a battery 28 that provides power to drive the rear wheels 18 of the vehicle 10. The battery 28 includes one or more components (not shown), such as a cell array, a module, and an electrical connector. One or more of the components may be recyclable or replaceable, and to access these components, the battery enclosure 26 is disconnectable into two or more pieces to expose the battery 28. The battery enclosure 26 includes a base 30, a lid 32, a plurality of fasteners 34, and a metal joint 36 connecting the base 30 and the lid 32.

With continued reference to FIG. 2, the base 30 connects to the rails 16 (FIG. 1) of the vehicle frame 12 (FIG. 1) via one or more of the fasteners 34, such as bolts. The base 30 and the lid 32 are joined by the metal joint 36, such as a solder joint or a braze joint, that inhibits dust and moisture entry into the battery enclosure 26, protecting the battery 28 from external degradation and contaminants. As described below, the metal joint 36 is designed to be disconnected to remove the lid 32 and one or more components of the battery 28 from the base 30. The components of the battery 28 are removed from the base 30 for recycling and/or repair. Then, upon replacement of the recyclable components, a new metal joint 36 can be formed between the base 30 and the lid 32.

Figure 3:
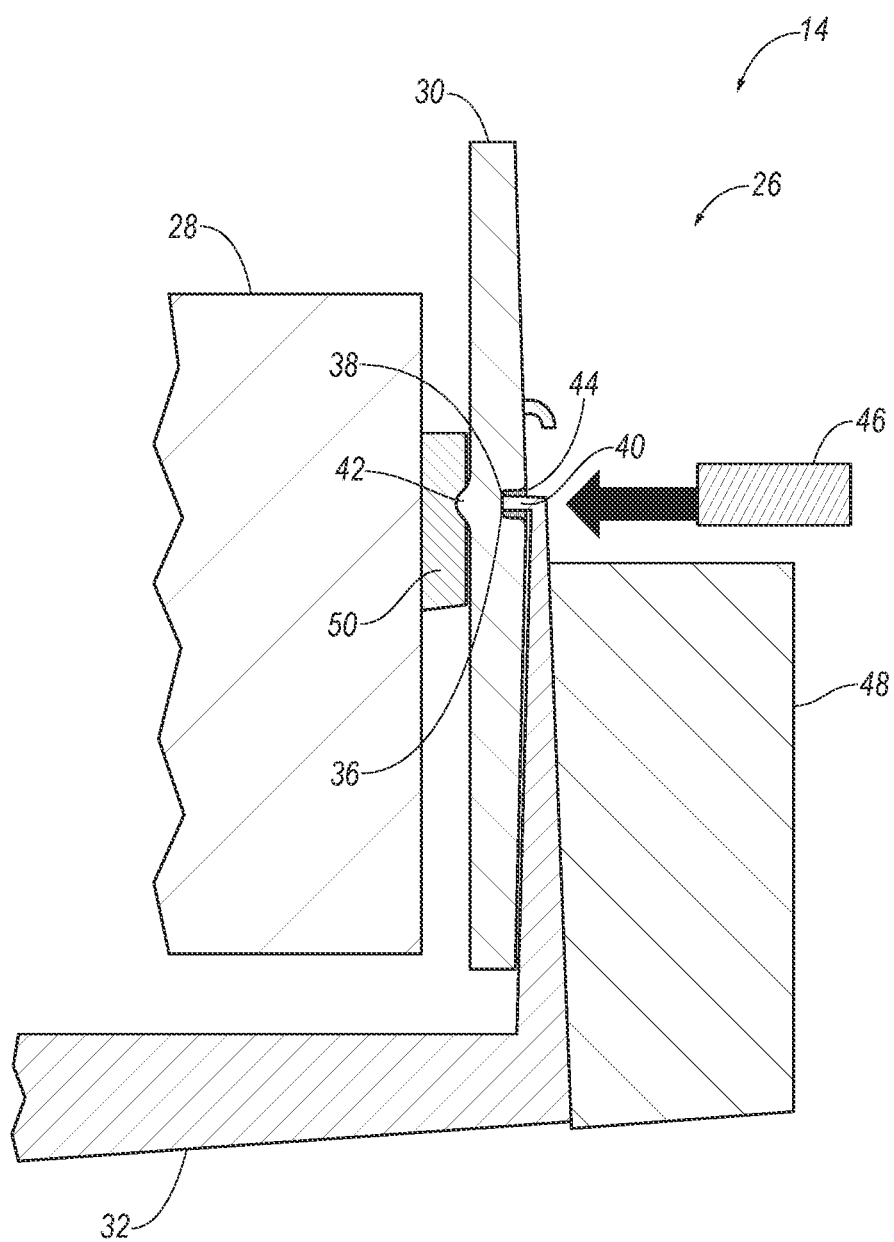
FIG. 3 is a cross-sectional view of a metal joint formed between a base and a lid of a battery enclosure according to the present disclosure.
Figure 4:
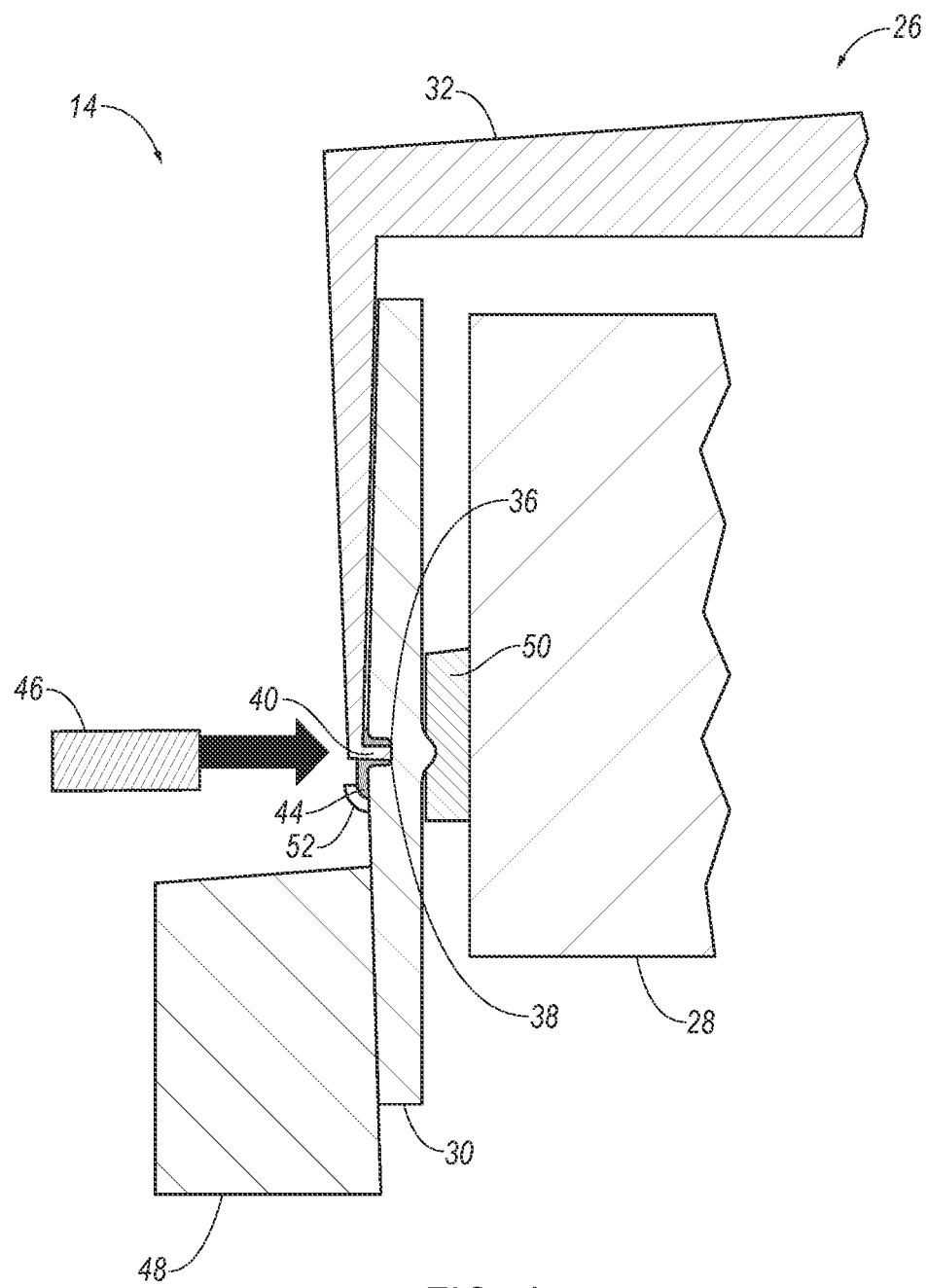
FIG. 4 is a cross-sectional view of removal of the metal joint according to the present disclosure.

With reference to FIGS. 3-4, the battery assembly 14 is shown in further detail. The base 30 includes a first locking feature 38, and the lid 32 includes a second locking feature 40. The first locking feature 38 and the second locking feature 40 engage each other to inhibit relative movement between the lid 32 and the base 30 while the metal joint 36 is applied between the first and second locking features 38, 40. In the forms shown, the first locking feature 38 is a groove and the second locking feature 40 is a tab disposed in the groove. In one form, the base 30 optionally includes a protrusion 42 opposite the groove that provides additional mechanical support that would otherwise be provided by the material removed to form the groove. In an alternative form, not specifically shown, the first locking feature 38 is the tab and the second locking feature 40 is the groove.

Returning to FIG. 3, the metal joint 36 is formed by melting a metal 44 onto the first and second locking features 38, 40, and, as the metal cools, the metal 44 solidifies into the metal joint 36 to join the base 30 to the lid 32. In one form, the metal 44 is one of a solder paste and a braze paste, which can include one or more of tin, antimony, bismuth, copper, indium, and/or silver. In such a form, the resulting metal joint 36 is one of a solder joint and a braze joint. In the form of FIG. 3, the base 30 is positioned above the lid 32 such that the metal 44 flows downward by gravity onto the first and second locking features 38, 40 to form the metal joint 36.

To melt the metal 44, heat is applied with a heater 46, at a location where the first locking feature 38 engages the second locking feature 40, such as the location where the tab engages the groove. In a non-limiting example, the heater 46 is one of a laser, an electric heater (such as ohmic or resistive heating, inductive heating, arc welding/heating, etc.), or a combustion heater (such as a braze oven, a blowtorch, a welder, etc.), and it is within the scope of the disclosure to use a different heater 46 or other device to apply the heat to melt the metal 44. In one form, the heater 46 is moved to a position relative to the base 30 and the lid 32 such that only a localized region around the first and second locking features 38, 40 is heated, e.g., the heater 46 is moved within 1 mm of the first and second locking features 38, 40. By heating only the localized region, parts of the base 30 and the lid 32 that may be temperature-sensitive are minimally affected by the heat from the heater 46.

The heater 46 is actuated to heat the metal 44 to a temperature above a melting temperature of the metal 44 and below respective melting temperatures of the first locking feature 38 and the second locking feature 40, such that only the metal 44 melts upon application of the heat. In the example shown, the base 30 and the lid 32 are formed of metals having respective melting temperatures above the melting temperature of the metal 44 of the metal joint 36.

In another form not shown in the drawings, the base 30 includes a metal portion on which the first locking feature 38 is located, and the lid 32 includes a metal portion on which the second locking feature 40 is located. In such a form, the heater 46 is actuated to heat the base 30 and the lid 32 to a temperature below respective melting temperatures of other materials comprising the base 30 and the lid 32, such as polymers and composites.

In one form, the heater 46 begins heating the metal 44 at a first location on the battery enclosure 26 and is moved along the battery enclosure 26 to form the metal joint 36. In such a form, the metal joint 36 extends continuously along the battery enclosure 26. In the form of FIG. 3, the metal 44 is heated to form the metal joint 36, connecting the first and second locking features 38, 40.

In the form of FIG. 3, a fixture 48 may apply pressure to the lid 32. The fixture 48 applies a compressive force (i.e., pressure) to the lid 32, causing the second locking feature 40 to engage the first locking feature 38. This pressure directs flow of the molten metal 44 along the first and second locking features 38, 40 and inhibits movement of the molten metal 44. That is, the pressure causes the first and second locking features 38, 40 to form a seal that lacks a flow path through which the molten metal 44 can move. The fixture 48 is released when the molten metal 44 solidifies into the metal joint 36.

In the form of FIG. 4, the metal joint 36 is removed to disconnect the first locking feature 38 from the second locking feature 40, releasing the base 30 from the lid 32. Without the metal joint 36, the first locking feature 38 is removable from the second locking feature 40. During the removal process, the battery enclosure 26 may be oriented upside-down relative to the orientation used during assembly (shown in FIG. 3). In other words, the lid 32 is generally above the base 30 during removal, whereas the base 30 is generally above the lid 32 during assembly.

The fixture 48 applies pressure to an outer portion of the base 30 during the removal of the metal joint 36. The fixture 48 applies a compressive force (i.e., pressure) to the base 30, biasing the first locking feature 38 inward and away from the second locking feature 40, causing the first locking feature 38 to disconnect from the second locking feature 40 when the metal joint 36 is melted. That is, as the metal 44 of the metal joint 36 melts, the pressure from the fixture 48 pushes the base 30 away from the lid 32, causing the groove to disengage from the tab. The pressure from the fixture 48 spreads the base 30 from the lid 32 to allow gravity to cause the molten metal 44 to flow downward, out of the groove (i.e., the first locking feature 38) and away from the first and second locking features 38, 40.

The base 30 may optionally include a channel 52 or trough that is open in the upward direction toward the lid 32 during the removal process, i.e., the orientation shown in FIG. 4. This channel 52 is disposed adjacent to the first and second locking features 38, 40 and extends around the entire perimeter of the base 30 to receive the molten metal 44 from the metal joint 36 upon application of heat during the removal process. In the form shown, the channel 52 is a rounded portion of the base 30 disposed below the metal joint 36 when in the orientation shown in FIG. 4. In an alternative form, not specifically shown, the channel 52 may have a different shape, such as a rectangular or triangular shape. In another form not shown in the FIGS., the battery enclosure 26 lacks the channel 52, and the molten metal 44 is collected by another method, such as a separate trough or basin. In one form, the molten metal 44 can solidify in the channel 52 after the removal process and then, when reassembling the battery enclosure 26, the heat can be applied to melt the molten metal 44 such that if flows out of the channel 52 and back between the first and second locking features 38, 40, to re-seal the lid 32 to the base 30.

In another form not shown in the drawings, an interior of the battery enclosure 26 is pressurized with air via a vent port (not shown) to increase an air pressure of the battery enclosure 26. The increased air pressure of the interior pushes the lid 32 and the tab of the second locking feature 40 away from the base 30 and the groove of the first locking feature 38 as the metal joint 36 is melted. The pressurized air may also assist in removal of the molten metal 44 by forcing the molten metal away from the first and second locking features 38, 40. This pressurized air can be used instead of or in addition to the inward pressure from the fixture 48.

Referring to FIGS. 3 and 4, a thermal insulator 50 may optionally be disposed between the battery 28 and the first and second locking features 38, 40. The insulator 50 protects the battery 28 from the heat applied to the battery enclosure 26 by the heater 46 during formation and removal of the metal joint 36. The insulator 50 absorbs heat from the base 30 that is heated by the heater 46. In one form, the insulator 50 is in contact with the protrusion 42 and the battery 28. The insulator 50 is a suitable type of thermal insulator, such as glass fiber or polymer foam, that is designed to reduce heat transfer from the base 30 to the battery 28 to limit the temperature increase of the battery 28. In another form, the battery assembly 14 does not include the insulator 50.

Accordingly, the present disclosure provides for a battery enclosure and method that improves efficiency of assembly and disassembly thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery assembly, comprising:
   a base including a side wall and a first locking feature, the first locking feature located at an outer surface of the side wall;
   a lid including a second locking feature; and
   a metal joint fusing the first locking feature to the second locking feature,
   wherein the metal joint is configured to melt to disconnect the first locking feature from the second locking feature.

2. The battery assembly of claim 1, wherein one of the first locking feature and the second locking feature is a groove, and the other of the first locking feature and the second locking feature is a tab disposed in the groove.

3. The battery assembly of claim 1, further comprising a channel disposed below the first and second locking features, the channel arranged to receive molten metal from the metal joint.

4. The battery assembly of claim 3, wherein the channel is disposed on the base and extends upward toward the lid.

5. The battery assembly of claim 1, wherein the metal joint has a melting temperature below respective melting temperatures of the first locking feature and the second locking feature.

6. The battery assembly of claim 1, further comprising a battery disposed in the base.

7. The battery assembly of claim 6, further comprising an insulator disposed between the battery and the first and second locking features.

8. The battery assembly of claim 1, wherein the metal joint is one of a solder joint and a braze joint.

9. The battery assembly of claim 1, wherein the base includes a protrusion disposed opposite the second locking feature.

10. The battery assembly of claim 9, further comprising a battery and an insulator, the insulator in contact with the protrusion and the battery.

11. The battery assembly of claim 10, wherein the insulator is configured to absorb heat from the base.

12. The battery assembly of claim 1, wherein the first and second locking features are biased toward each other upon melting the metal joint.

13. A battery assembly, comprising:
    a base including a side wall and a first locking feature;
    a lid overlapping an upper, outer surface of the side wall of the base and including a second locking feature configured to engage with the first locking feature to inhibit relative movement between the lid and the base; and
    a metal joint fusing the first locking feature to the second locking feature,
    wherein the metal joint is configured to melt to disconnect the first locking feature from the second locking feature.

14. The battery assembly of claim 13, wherein one of the first locking feature and the second locking feature is a groove, and the other of the first locking feature and the second locking feature is a tab disposed in the groove.

15. The battery assembly of claim 13, further comprising a channel disposed below the first and second locking features, the channel arranged to receive molten metal from the metal joint.

16. The battery assembly of claim 15, wherein the channel is disposed on the base and extends upward toward the lid.

17. The battery assembly of claim 13, wherein the metal joint has a melting temperature below respective melting temperatures of the first locking feature and the second locking feature.

18. The battery assembly of claim 13, further comprising a battery disposed in the base.

19. The battery assembly of claim 18, further comprising an insulator disposed between the battery and the first and second locking features.

20. The battery assembly of claim 13, wherein the metal joint is one of a solder joint and a braze joint.

\* \* \* \* \*